United States Patent
Suzuki et al.

(10) Patent No.: US 8,422,228 B2
(45) Date of Patent: Apr. 16, 2013

(54) COOLING JACKET, COOLING UNIT, AND ELECTRONIC APPARATUS

(75) Inventors: Masumi Suzuki, Kawasaki (JP); Michimasa Aoki, Kawasaki (JP); Yosuke Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 12/620,396

(22) Filed: Nov. 17, 2009

(65) Prior Publication Data

US 2010/0142145 A1    Jun. 10, 2010

(30) Foreign Application Priority Data

Dec. 4, 2008  (JP) ................................. 2008-309924

(51) Int. Cl.
*H05K 7/20* (2006.01)
*F28D 21/00* (2006.01)

(52) U.S. Cl.
USPC ........... 361/699; 361/700; 361/701; 361/702; 361/717; 361/719; 361/679.53; 165/80.4; 165/104.33

(58) Field of Classification Search .................. 361/689, 361/699–702, 717, 719, 679.53; 165/157, 165/80.2, 80.4, 80.5, 104.33
See application file for complete search history.

(56) References Cited

U.S. PATENT DOCUMENTS

| | | | | |
|---|---|---|---|---|
| 5,006,924 A * | 4/1991 | Frankeny et al. | ............. | 257/714 |
| 5,978,220 A * | 11/1999 | Frey et al. | ..................... | 361/699 |
| 6,256,201 B1 * | 7/2001 | Ikeda et al. | ................... | 361/704 |
| 6,755,626 B2 | 6/2004 | Komatsu et al. | | |
| 6,845,011 B2 * | 1/2005 | Tomioka et al. | .............. | 361/699 |
| 6,992,382 B2 * | 1/2006 | Chrysler et al. | .............. | 257/717 |
| 7,149,084 B2 | 12/2006 | Matsushima et al. | | |
| 7,184,265 B2 * | 2/2007 | Kim et al. | ................ | 361/679.47 |
| 7,254,030 B2 * | 8/2007 | Chiba et al. | ................... | 361/710 |
| 7,265,979 B2 * | 9/2007 | Erturk et al. | ................... | 361/702 |
| 7,337,829 B2 * | 3/2008 | Miyazaki et al. | ........ | 165/104.29 |
| 7,365,981 B2 * | 4/2008 | Myers et al. | .................. | 361/699 |
| 7,828,047 B2 * | 11/2010 | Miyazaki et al. | ........ | 165/104.29 |
| 2004/0042171 A1 * | 3/2004 | Takamatsu et al. | ........... | 361/687 |
| 2004/0240178 A1 | 12/2004 | Kim et al. | | |

FOREIGN PATENT DOCUMENTS

| | | |
|---|---|---|
| JP | 3-006838 U | 1/1991 |
| JP | 2003-120548 A | 4/2003 |
| JP | 2004-028508 | 1/2004 |
| JP | 2004-289049 A | 10/2004 |
| JP | 2007-010211 | 1/2007 |
| JP | 2007-258241 | 10/2007 |
| KR | 10-2005-0081816 | 8/2005 |

OTHER PUBLICATIONS

"Korean Office Action", mailed by Korean Patent Office and corresponding to Korean application No. 10-2009-0095657 on Jul. 25, 2011, with English translation.

(Continued)

*Primary Examiner* — Anatoly Vortman
(74) *Attorney, Agent, or Firm* — Fujitsu Patent Center

(57) ABSTRACT

A cooling jacket includes: a flow channel member through which a cooling medium flows, at least a part of which is in contact with an object to be cooled, and which includes a region having a channel cross-sectional area larger than that of any other region; and a projection portion which is provided at a downstream side of the region where the channel cross-sectional area is large.

10 Claims, 8 Drawing Sheets

OTHER PUBLICATIONS

Chinese Office Action mailed Aug. 22, 2011 for corresponding Chinese Application No. 200910206578.1, with English-language translation.

Japanese Office Action mailed Dec. 18, 2012 for corresponding Japanese Application No. 2008-309924, with English-language translation.

* cited by examiner

COOLING JACKET, COOLING UNIT, AND ELECTRONIC APPARATUS

CROSS-REFERENCE TO RELATED APPLICATION

This application is based upon and claims the benefit of priority of the prior Japanese Patent Application No. 2008-309924, filed on Dec. 4, 2008, the entire contents of which are incorporated herein by reference.

FIELD

The embodiment discussed herein is related to a cooling jacket, a cooling unit, and an electronic apparatus.

BACKGROUND

There is known a technique of cooling an electronic part installed in an electronic apparatus by using a liquid cooling medium. Bubbles may be generated in a flow channel through which the cooling medium flows. There is a technique of catching such bubbles at a given position.

However, bubbles may not be caught at a given position at a high flow rate of the cooling medium.

SUMMARY

According to an aspect of the embodiment, a cooling jacket includes: a flow channel member through which a cooling medium flows, at least a part of which is in contact with an object to be cooled, and which includes a region having a channel cross-sectional area larger than that of any other region; and a projection portion which is provided at a downstream side of the region where the channel cross-sectional area is large.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of embodiments with reference to the accompanying drawings.

Figure 1A:
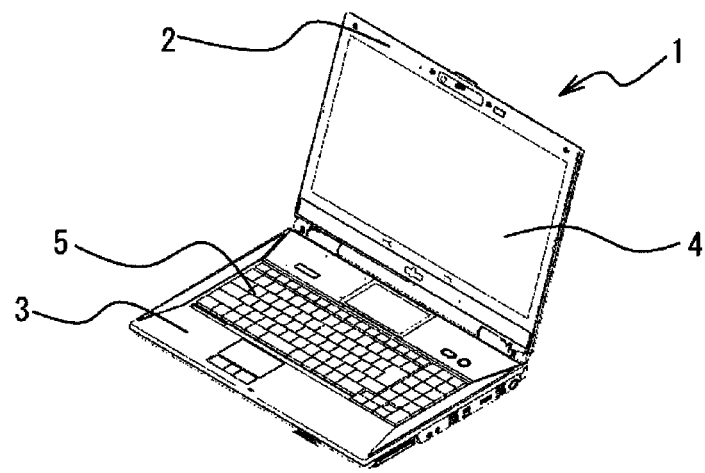
FIGS. 1A to 1C are explanatory views of a notebook computer.
Figure 1B:
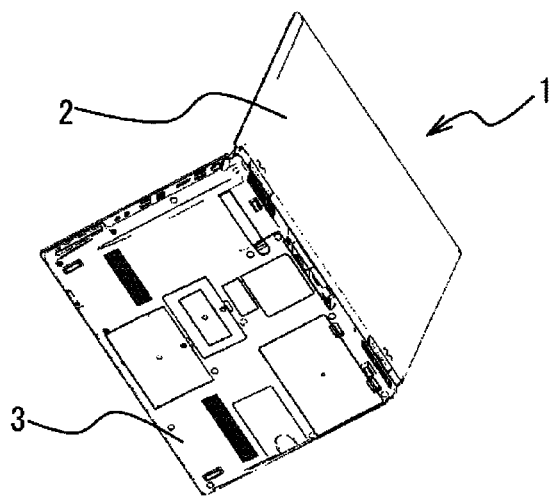
Figure 1C:
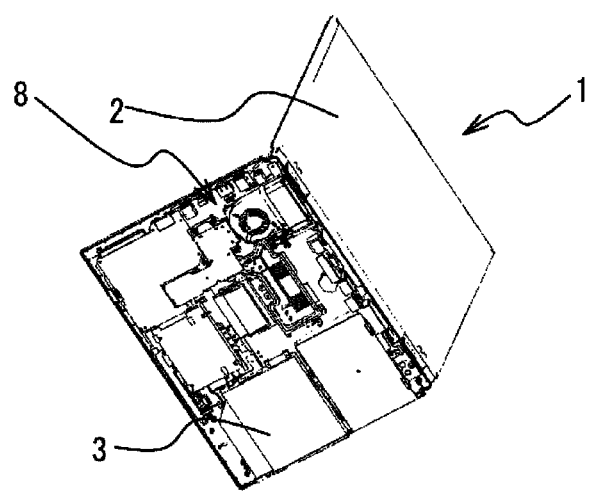
Figure 2:
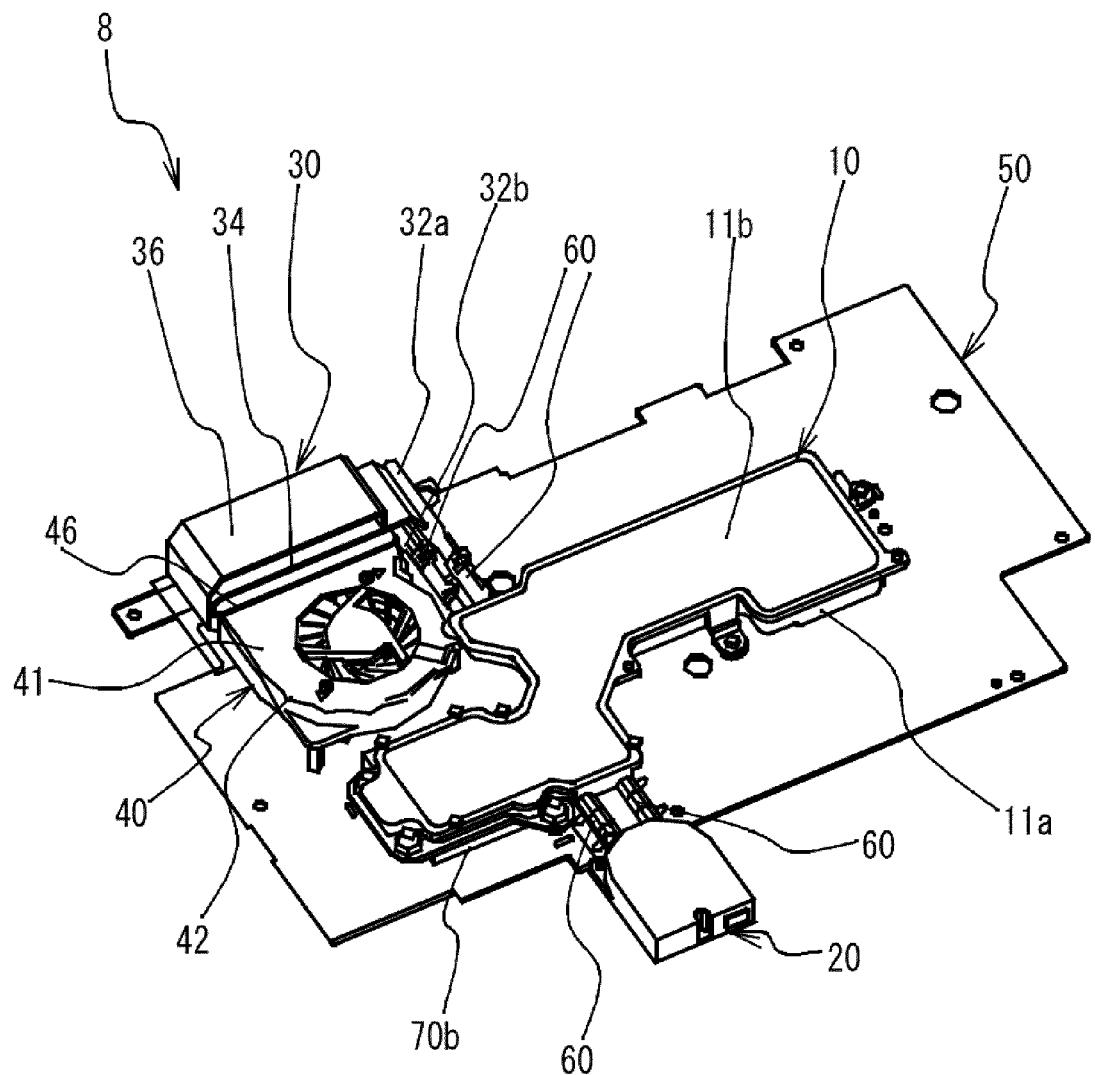
FIG. 2 is a perspective view of the cooling unit.

A notebook computer will be described as an example of an electronic apparatus. FIGS. 1A to 1C are explanatory views of a notebook computer 1. The notebook computer 1 includes a display portion 2 and a main portion 3 which are connected to open and close. The display portion 2 is provided with a liquid crystal display 4. The main portion 3 is provided with a keyboard 5. The main portion 3 is equipped with various electronic parts. FIG. 1C is a perspective view of the notebook computer 1 when viewed from its bottom side, and illustrates the notebook computer 1 from which a bottom cover is detached. As illustrated in FIG. 1C, a cooling unit 8 is installed in the main portion 3. The cooling unit 8 cools electronic parts included in the notebook computer 1. FIG. 2 is a perspective view of the cooling unit 8. The cooling unit 8 is mounted on a printed substrate. The cooling unit 8 includes a cooling jacket 10, a pump 20, a radiator 30, and a cooling fan 40.

A cooling medium flows through the cooling jacket (hereinafter referred to as jacket) 10. The jacket 10 includes a case 11a and a cover 11b. The case 11a and the cover 11b are made of, for example, a metal having good heat conduction such as copper or aluminum. The jacket 10 has a flat shape.

The pump 20 circulates the cooling medium between the jacket 10 and the radiator 30. The pump 20 is electrically operated. Additionally, the pump 20 and the jacket 10 are communicated via rubber tubes 60. The rubber tubes 60 are provided for preventing the cooling medium from being leaked. The rubber tubes 60 are fastened by metallic belts. The pump 20 has a flat shape.

The radiator 30 radiates the heat received by the cooling medium from the jacket 10. The radiator 30 is made of, for example, a metal such as aluminum. The radiator 30 includes: a tube 34, a surrounding plate 36, an outlet pipe 32a, and an inlet pipe 32b. The tube 34, through which the cooling medium flows, has a flat shape and a substantially U shape. The outlet pipe 32a and the inlet pipe 32b are communicated to ends of the tube 34, respectively. Further, the surrounding plate 36 surrounds the tube 34. The outlet pipe 32a and the inlet pipe 32b are communicated to the jacket 10. The outlet pipe 32a and the inlet pipe 32b, and the jacket 10 are communicated via the rubber tubes 60. In addition, plural fins, not illustrated, are provided between the surrounding plate 36 and the tube 34. Also, plural fins, not illustrated, are provided between the opposite surfaces of the tube 34.

The cooling fan 40 has an opening 41 and houses a fan 42. When the fan 42 rotates, air is sucked into the cooling fan 40 via the opening 41, and then exhausted from a blowing hole 46. The blowing hole 46 faces the radiator 30. The air exhausted from the blowing hole 46 blows into the radiator 30. This promotes the radiation of the heat of the cooling medium in the radiator 30.

A printed substrate 50 is a printed-wiring board with rigidity, and a given pattern is printed thereon. Plural electronic parts are mounted on the printed substrate 50. These electronic parts are heated by being supplied with electric power. A CPU (Central Processing Unit) 70b is one of the electronic parts mounted on the printed substrate 50. The CPU 70b is in contact with the cover 11b. Therefore, the cooling medium flowing through the jacket 10 receives heat from the CPU 70b, thereby cooling the CPU 70b. The jacket 10, the radiator 30, and the cooling fan 40 are secured on the printed substrate 50.

The cooling medium is, for example, water or antifreeze liquid. The antifreeze liquid is made by adding an antifreeze agent (such as propylene glycol) into water.

Figure 3:
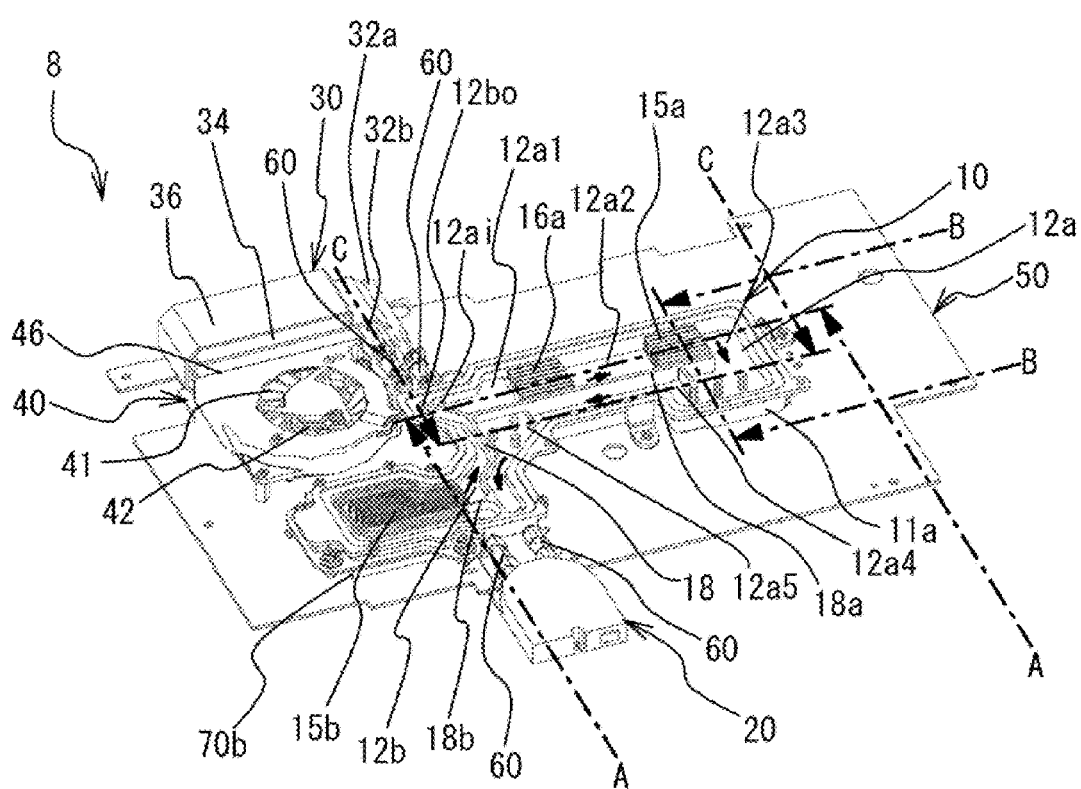
FIG. 3 is an explanatory view of an inner structure of a jacket.

FIG. 3 is an explanatory view of an inner structure of the jacket 10. FIG. 3 illustrates a state in which the cover 11b is detached from the case 11a.

Flow channels 12a and 12b are provided within the jacket 10. Specifically, the flow channels 12a and 12b are provided in the case 11a. The case 11a and the cover 11b correspond to a flow channel member defining the flow channels 12a and 12b. The flow channels 12a and 12b are separated by a partition wall 18. That is, the flow channels 12a and 12b do not cross.

Figure 4:
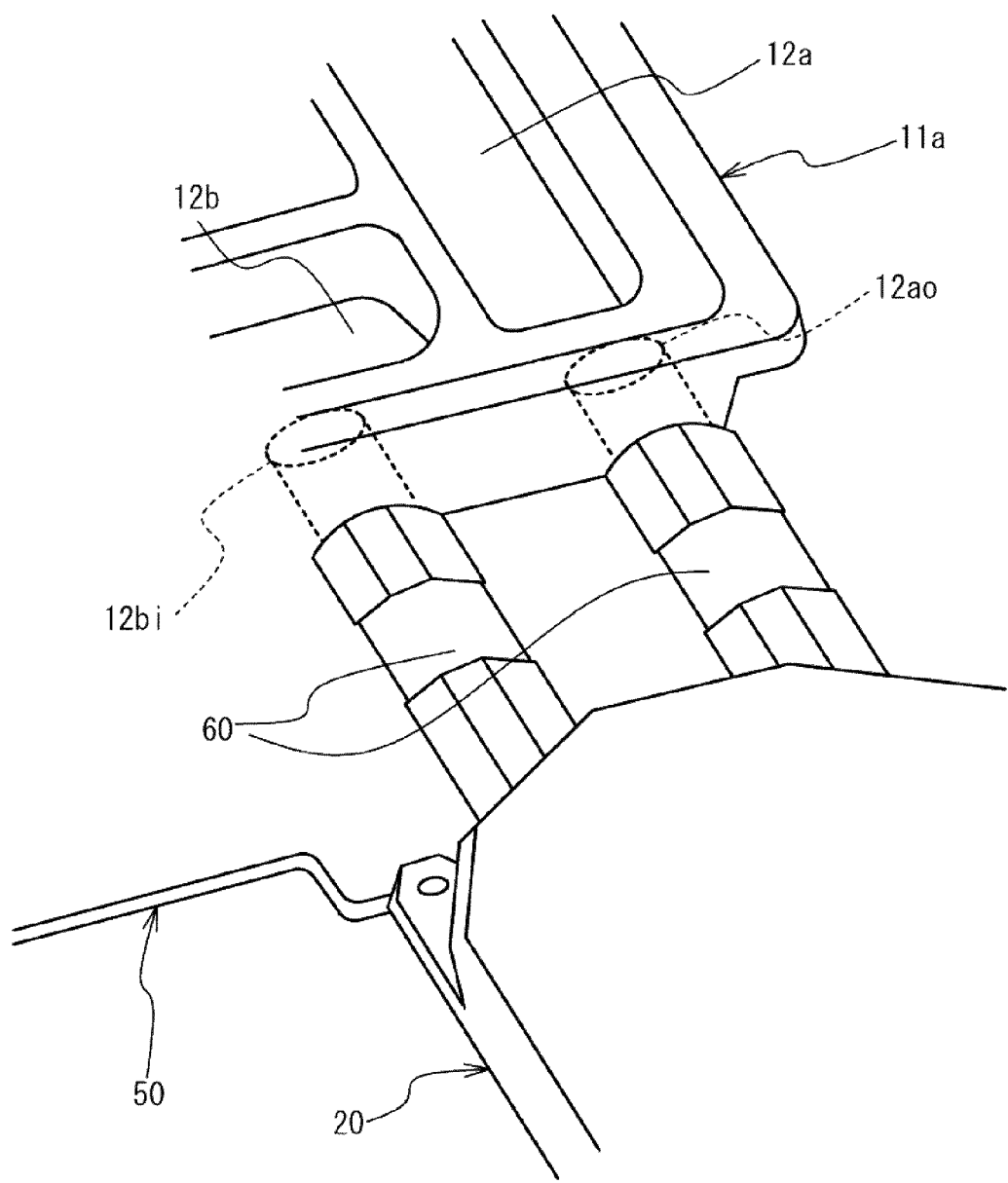
FIG. 4 is a schematic view of the periphery of a pump.

The flow channel 12a includes: an inlet 12ai through which the cooling medium is introduced into the flow channel 12a; and an outlet 12ao through which the cooling medium is exhausted from the flow channel 12a. Also, the flow channel 12b includes: an inlet 12bi through which the cooling medium is introduced into the flow channel 12b; and an outlet 12bo through which the cooling medium is exhausted from the flow channel 12b. FIG. 4 is a schematic view of the periphery of the pump 20.

The cooling medium exhausted from the radiator 30 is introduced into the flow channel 12a via the inlet 12ai. The cooling medium exhausted from the outlet 12ao is sucked into the pump 20. The sucked cooling medium is exhausted into the flow channel 12b via the inlet 12bi, so that the cooling medium is exhausted to the radiator 30 via the outlet 12bo. Further, the inlet 12ai is communicated to the outlet pipe 32a, and the outlet 12bo is communicated to the inlet pipe 32b.

The flow channel 12a is provided with projection portions 15a and 16a. The projection portions 15a and 16a will be described later in more detail. The cooling medium flows around a partition wall 18a in the flow channel 12a.

The flow channel 12b is provided with fins 15b. The fins 15b extend along a curved section of the flow channel 12b. The cooling medium flows around a partition wall 18b in the flow channel 12b. The case 11a is in contact with the CPU 70b at a position corresponding to the fins 15b. The fins 15b serve to ensure the contact area in contact with the cooling medium. Therefore, the heat of the CPU 70b effectively transfers to the cooling medium via the fins 15b.

Next, a description will be given of the projection portions 15a and 16a.

The projection portion 15a is provided at the downstream side of the flow channel 12a and the projection portion 16a at the upstream side. Each of the projection portions 15a and 16a has an identical shape. The projection portions 15a and 16a allow the cooling medium to flow, and catch bubbles. The projection portions 15a and 16a extend from an inner surface of the case 11a, which defines the flow channel 12a, to an inner surface of the cover 11b. The inner surface of the case 11a corresponds to a first inner surface, and the inner surface of the cover 11b corresponds to a second inner surface facing the first inner surface. In addition, when the notebook computer 1 is normally used, the case 11a is located at an upper side, and the cover 11b is located at a lower side. That is, the case 11a is located at the upper side, and the cover 11b is located at the lower side. The projection portions 15a and 16a are provided at the upper side of the inner surface of the flow channel 12a. Moreover, the normally used means that the bottom surface of the main portion 3 is placed on the horizontal plane. The shapes of the projection portions 15a and 16a will be described later in more detail.

The flow channel 12a includes: an inlet peripheral section 12a1; a wide section 12a2; a curve section 12a3; a linear section 12a4; and an outlet peripheral section 12a5, in this order from the inlet 12ai to the outlet 12ao. The projection portions 15a and 16a are provided in the wide section 12a2. The projection portion 15a is provided at the downstream side of the wide section 12a2, and the projection portion 16a is provided at the upstream side of the wide section 12a2. The wide section 12a2 has a linear shape, and is wider than any other region. Additionally, the wide section 12a2 is higher than any other region.

Figure 5A:
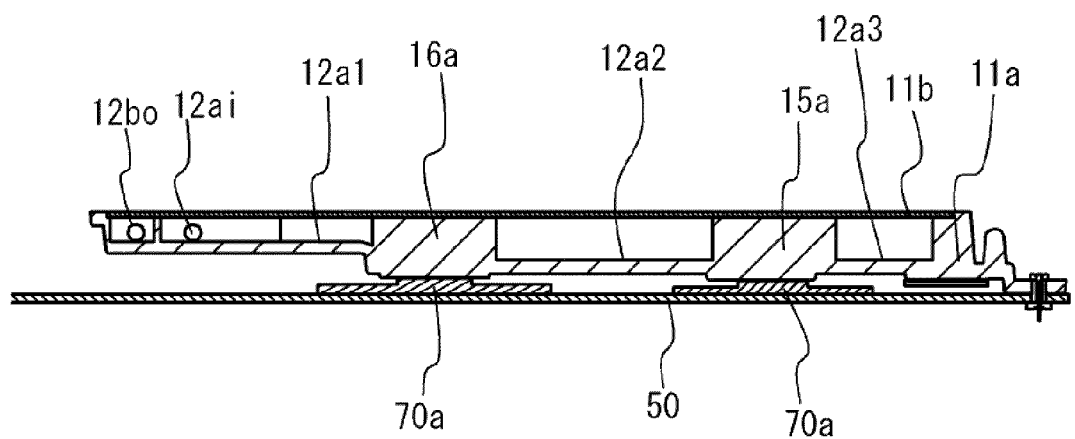
FIG. 5A is a cross-sectional view taken along a line A-A of FIG. 3.
Figure 5B:
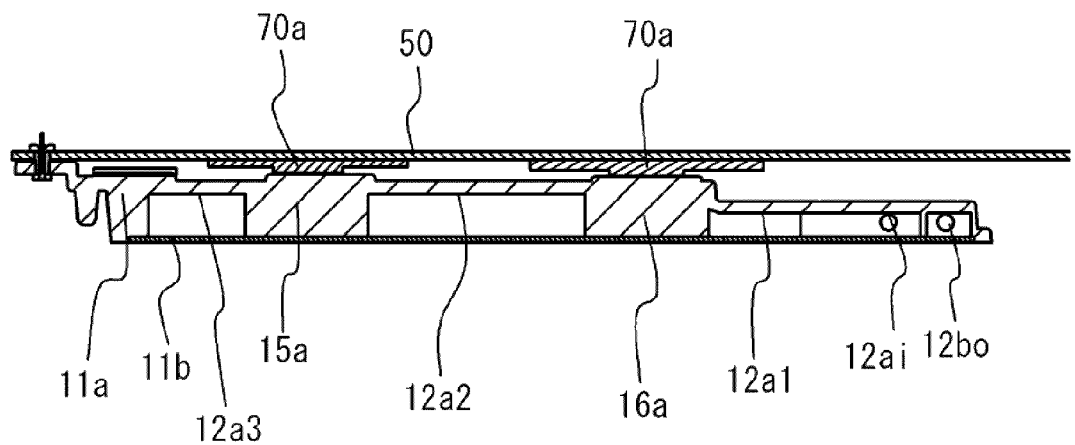
FIG. 5B is a view corresponding to FIG. 5A when the notebook computer is normally used.

FIG. 5A is a cross-sectional view taken along a line A-A of FIG. 3. FIG. 5B is a view corresponding to FIG. 5A when the notebook computer 1 is normally used. As illustrated in FIGS. 5A and 5B, the case 11a is in contact with electronic parts 70a at positions corresponding to the projection portions 15a and 16a, respectively. The electronic parts 70a are mounted on the printed substrate 50. The cooling medium, which is introduced into the flow channel 12a via the inlet 12ai, flows through the projection portion 16a. The cooling medium passes through the projection portion 16a to flow through the wide section 12a2, and then passes through the projection portion 15a to flow through the curve section 12a3. When bubbles are infiltrated into the flow channel 12a via the inlet 12ai, the bubbles are caught by the projection portion 16a or 15a. This prevents the bubbles from flowing into the pump 20. This also suppresses the noise caused by the pump sucking the bubbles.

As illustrated in FIGS. 3, 5A, and 5B, the channel cross-sectional area in the wide section 12a2 is larger than that in the inlet peripheral section 12a1. That is, the channel cross-sectional area of the flow channel 12a is larger from the inlet 12ai to the projection portion 15a. Therefore, the flow rate of the cooling medium is smaller in the wide section 12a2 than that in the inlet peripheral section 12a1. Thus, even when the bubbles are passed through the projection portion 16a by the cooling medium having a high flow rate in the inlet peripheral section 12a1, the bubbles are prevented from passing through the projection portion 15a, since the flow rate of the cooling medium is decreased in the wide section 12a2.

Further, the flow rate of the cooling medium is decreased in the wide section 12a2, thereby ensuring the period from when the small bubbles are caught by the projection portion 15a to when such plural small bubbles are corrected to be large bubbles. As a result, the small bubbles are changed into the large bubble, so that it is difficult for the large bubbles to pass through the projection portion 15a.

Furthermore, projection pieces 15a1 extend along the direction in which the cooling medium flows. This reduces the flow rate of the cooling medium in front of the plural projection pieces 15a1. This arrangement also prevents the bubbles from passing through the projection portion 15a.

Moreover, as illustrated in FIG. 3, the projection portion 15a is provided in the wide section 12a2 in front of the curve section 12a3. Generally, a flowing fluid partially stagnates in the vicinity of a curved section of a flow channel. The projection portion 15a is provided at such a position, thereby preventing the bubbles from passing through the projection portion 15a.

Also, the bubbles caught by the projection portion 15a are prevented from retuning to the upstream side by the projection portion 16a. This catches the bubbles between the projection portions 15a and 16a. For example, while the notebook computer 1 is being carried, the cooling medium may be reversely flown. In even such a case, the bubbles can be caught.

Figure 6A:
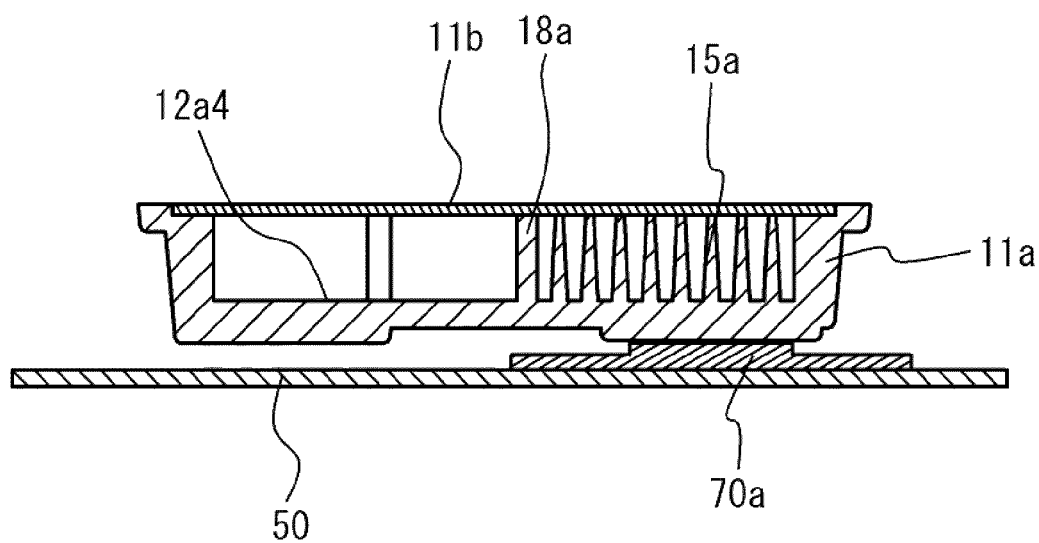
FIG. 6A is a cross-sectional view taken along a line B-B of FIG. 3.
Figure 6B:
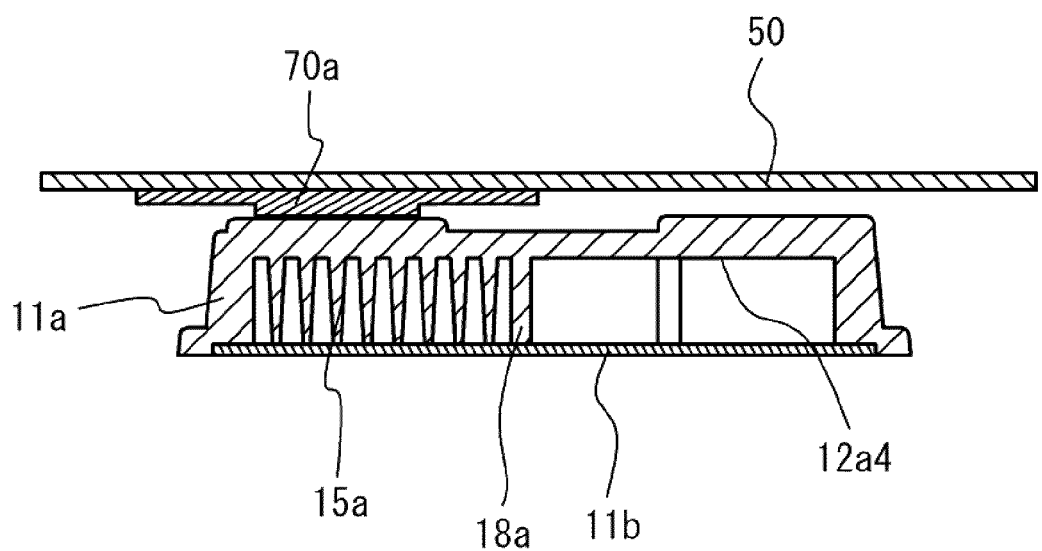
FIG. 6B is a view corresponds to FIG. 6A when the notebook computer is normally used.
Figure 7:
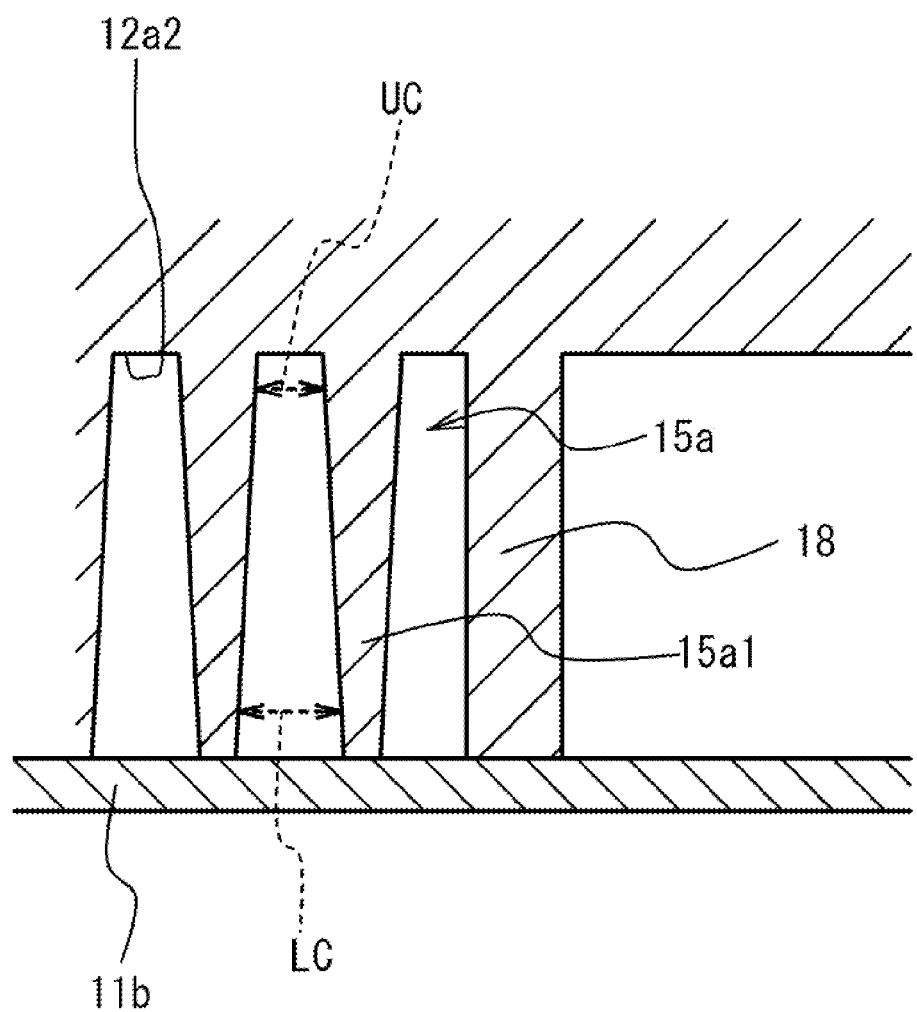
FIG. 7 is an enlarged view of a projection portion illustrated in FIG. 6B.

Next, a description will be given of a shape of the projection portion 15a. FIG. 6A is a cross-sectional view taken along a line B-B of FIG. 3. FIG. 6B is a view corresponds to FIG. 6A when the notebook computer 1 is normally used. FIG. 7 is an enlarged view of the projection portion 15a illustrated in FIG. 6B.

As illustrated in FIG. 7, the projection portion 15a includes the plural projection pieces 15a1. The projection pieces 15a1 extend from the inner surface of the case 11a to the inner surface of the cover 11b. The plural projection pieces 15a1 are aligned side by side in the direction perpendicular to the flowing direction of the cooling medium. In the gap between the adjacent projection pieces 15a1, a gap UC located at the upper side is narrower than a gap LC located at the lower side. Each of the projection piece 15a1 has a thin plate shape to extend along the flowing direction of the cooling medium.

Additionally, the bubbles are floated to the inner surface of the case 11a, that is, to the upper side by buoyancy. Since the gap UC located at the upper side is narrow, the bubble can be prevented from passing through the projection portion 15a. Further, since the gap LC located at the lower side is large, the flow of the cooling medium can be ensured.

Furthermore, as illustrated in FIGS. 5A, 5B, 6A, and 6B, the case 11a is in contact with the electronic part 70a at the position corresponding to the projection portion 15a. This transmits the heat of the electronic part 70a to the cooling material via the projection portion 15a. Moreover, the projection portion 15a includes plural projection pieces 15a1, thereby sufficiently ensuring the contact area of the cooling material in contact with the projection portion 15a. In this way, the projection portion 15a have functions to catch the bubbles and to improve cooling efficiency of the electronic part 70a. Like the projection portion 15a, the projection portion 16a has the similar functions. The jacket 10, the pump 20, the radiator 30, and the electronic parts 70a correspond to a cooling system. The electronic part 70a is, for example, an LSI (Large Scale Integration).

Additionally, the shape of the projection portion 15a may be interpreted as below. The projection portion 15a is provided with plural channels which extend along the flowing direction of the cooling medium. Each width of the channels of the projection portion 15a is narrower at the inner surface of the case 11a than at the inner surface of the cover 11b.

Moreover, as illustrated in FIGS. 5A, 5B, 6A, and 6B, end portions of the projection pieces 15a1 are in contact with the inner surface of the cover 11b. Even when the level of the cooling medium is lowered by using the notebook computer 1 for a long time, the contact of the projection pieces 15a1 with the cooling medium can be ensured. This prevents the degradation of cooling efficiency of the electronic parts 70a.

The CPU 70b has a heating value higher than that of the electronic part 70a. The projection portions 15a and 16a function to cool the electronic parts 70a each having a heating value lower than that of the CPU 70b. Since the bubbles are corrected in the vicinity of the projection portions 15a and 16a, if the projection portions 15a and 16a cool the CPU 70b having a high heating value, the CPU 70 may not be sufficiently cooled.

Figure 8A:
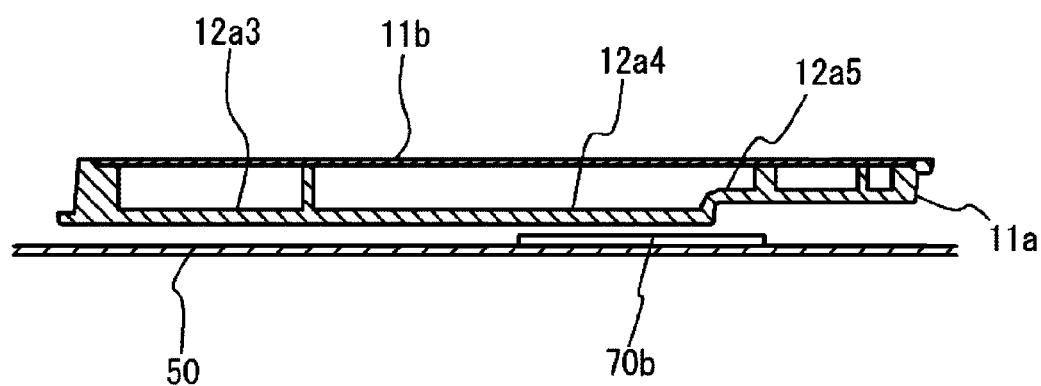
FIG. 8A is a cross-sectional view taken along a line C-C of FIG. 3.
Figure 8B:
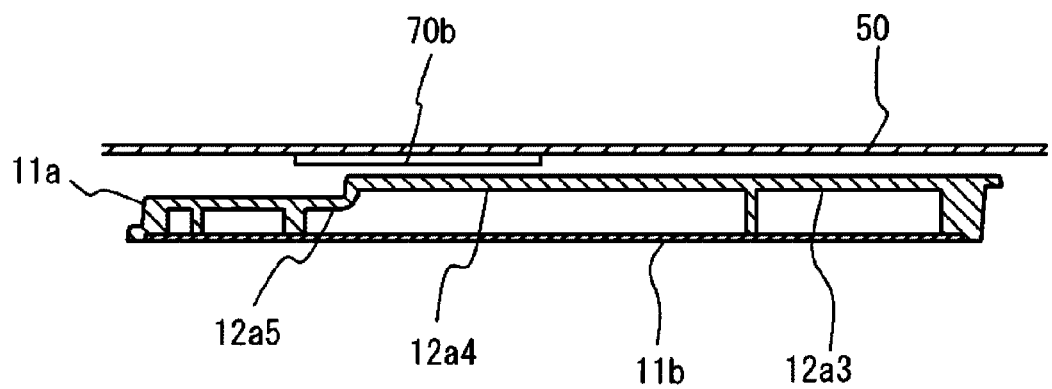
FIG. 8B is a view corresponds to FIG. 8A when the notebook computer is normally used.

FIG. 8A is a cross-sectional view taken along a line C-C of FIG. 3. FIG. 8B is a view corresponds to FIG. 8A when the notebook computer 1 is normally used. As illustrated in FIGS. 8A and 8B, the height of the outlet peripheral section 12a5 is less than the linear section 12a4. That is, the inner surface of the case 11a is arranged close to that of the cover 11b between the projection portion 15a and the outlet 12ao. When bubbles are present in the vicinity of the linear section 12a4, the bubbles are collected in the vicinity of the inner surface of the linear section 12a4 by buoyancy. Additionally, by the effect of the buoyancy, it is difficult for the bubbles to flow from the linear section 12a4 toward the outlet peripheral section 12a5. This prevents the bubbles from being sucked by the pump 20.

The projection portion 16a may not be provided. The projection portions 15a and 16a may not have the identical shape. The projection portions 15a and 16a are not limited to the shapes illustrated above.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A cooling jacket comprising:
   a flow channel member through which a cooling medium flows, at least a part of which is in contact with an object to be cooled, and which includes a region having a channel cross-sectional area larger than that of any other region of the channel; and
   a projection portion which is provided at a downstream side of the region where the channel cross-sectional area is large,
   the projection portion comprising adjacent projection pieces, each of the adjacent projection pieces having a plate shape, a gap between the adjacent projection pieces at an upper side being smaller than the gap between the adjacent projection pieces at a lower side.

2. The cooling jacket of claim 1, wherein the projection portion is provided at an upper inner surface of the flow channel member.

3. The cooling jacket of claim 1, wherein an upper inner surface of the region where the channel cross-sectional area is large is higher than an upper inner surface of any other region.

4. The cooling jacket of claim 1, wherein the projection portion is provided at a position corresponding to the object.

5. The cooling jacket of claim 1, wherein a second projection portion is provided at an upstream side of the region having a channel cross-sectional area larger than that of any other region of the channel.

6. The cooling jacket of claim 5, wherein the second projection portion is provided at an upper inner surface of the flow channel member.

7. The cooling jacket of claim 6, wherein the second projection portion is provided at a position corresponding to the object.

8. A cooling unit comprising:
   a cooling jacket comprising:
      a flow channel member through which a cooling medium flows, at least a part of which is in contact with an object to be cooled, and which includes a region having a channel cross-sectional area larger than that of any other region of the channel, and
      a projection portion which is provided at a downstream side of the region where the channel cross-sectional area is large, the projection portion comprising adjacent projection pieces, each of the adjacent projection pieces having a plate shape, a gap between the adjacent projection pieces at an upper side being smaller than the gap between the adjacent projection pieces at a lower side;
   a radiator which radiates heat received by the cooling media from the cooling jacket; and
   a pump which circulates the cooling medium between the cooling jacket and the radiator.

9. The cooling unit of claim 8, further comprising a cooling fan which is loaded to the radiator.

10. An electronic apparatus comprising:
an object to be cooled; and
a cooling unit comprising:
- a cooling jacket comprising:
    - a flow channel member through which a cooling medium flows, at least a part of which is in contact with the object, and which includes a region having a channel cross-sectional area larger than that of any other region of the channel, and
    - a projection portion which is provided at a downstream side of the region where the channel cross-sectional area is large, the projection portion comprising adjacent projection pieces, each of the adjacent projection pieces having a plate shape, a gap between the adjacent projection pieces at an upper side being smaller than the gap between the adjacent projection pieces at a lower side;
- a radiator which radiates heat received by the cooling media from the cooling jacket; and
- a pump which circulates the cooling medium between the cooling jacket and the radiator.

* * * * *